Figure 1:
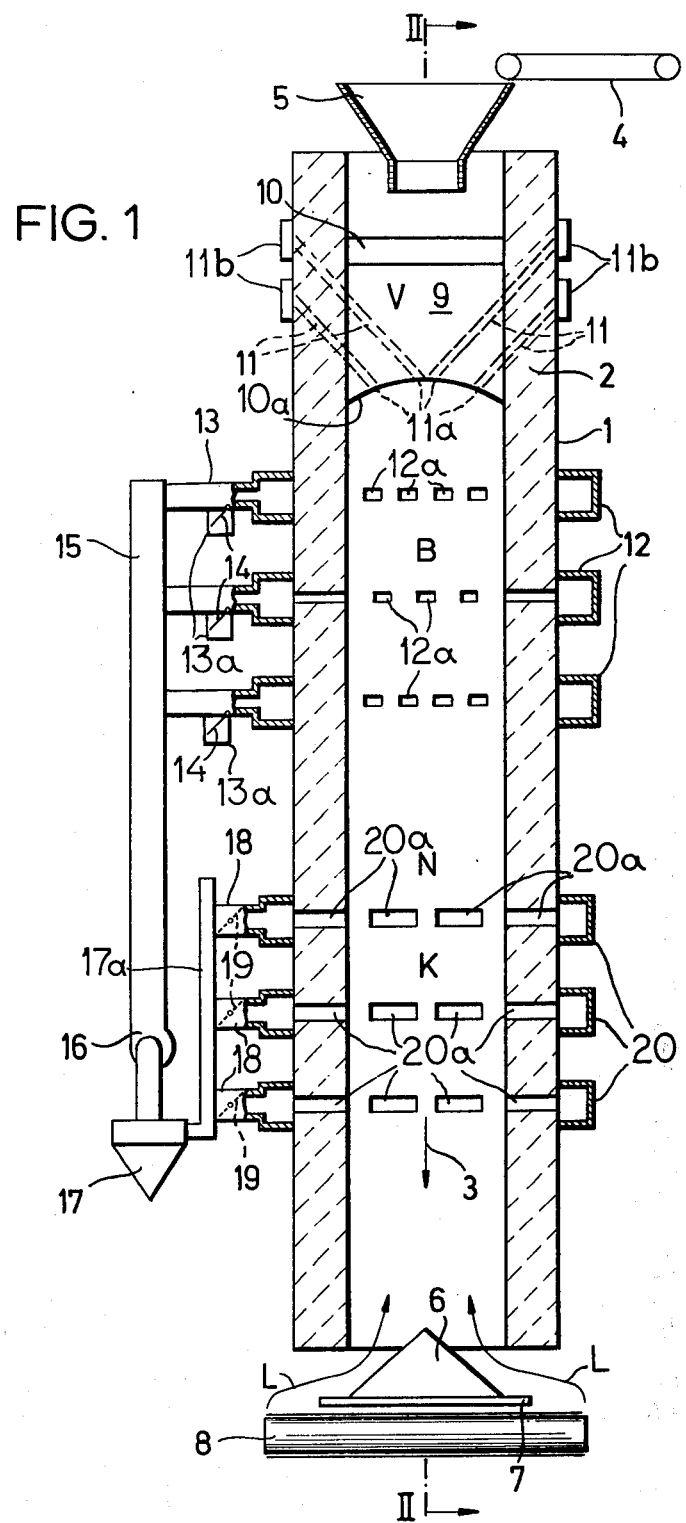

United States Patent

Buchner

[11] 3,941,557
[45] Mar. 2, 1976

[54] THERMAL TREATMENT OF GRANULAR OR LUMPY MATERIAL, PARTICULARLY FIRING LIME, DOLOMITE, MAGNESITE OR THE LIKE AND FURNACE THEREFOR

[75] Inventor: Heinrich Buchner, Niederkassel, Germany

[73] Assignee: Klockner-Humboldt-Deutz Aktiengesellschaft, Germany

[22] Filed: Dec. 23, 1974

[21] Appl. No.: 536,932

[30] Foreign Application Priority Data
Dec. 24, 1973 Germany............................ 2364650

[52] U.S. Cl. ........................ 432/17; 432/19; 432/99
[51] Int. Cl.². ...................... F27B 15/18; F27D 7/00
[58] Field of Search ............. 432/17, 19, 25, 26, 28, 432/96, 99, 95

[56] References Cited
UNITED STATES PATENTS
2,503,555   4/1950   Lykken ................................. 432/95
3,285,590   11/1966  Parsons ................................ 432/99

FOREIGN PATENTS OR APPLICATIONS
403,707   1933   United Kingdom................... 432/96

Primary Examiner—John J. Camby
Attorney, Agent, or Firm—Hill, Gross, Simpson, Van Santen, Steadman, Chiara & Simpson

[57] ABSTRACT

A calcining method and apparatus are provided wherein material to be treated is fed into the top of the furnace and the finished material discharges from the bottom of the furnace and cooling and combustion air enters under forced draft through the bottom of the furnace and flows upwardly through the column of material. A part of the fuel supply is delivered to the region between an upper preheating zone in the furnace and a subjacent combustion or firing zone and the balance of fuel required for firing is introduced into the combustion zone about its periphery. Provision is also made for bypassing part of the cooling air from a lower cooling zone to the combustion zone, with intermediate cleaning of the bypassed air.

19 Claims, 2 Drawing Figures

THERMAL TREATMENT OF GRANULAR OR LUMPY MATERIAL, PARTICULARLY FIRING LIME, DOLOMITE, MAGNESITE OR THE LIKE AND FURNACE THEREFOR

This invention relates to thermal treatment of lumpy and/or granular material and more particularly concerns calcining of limestone, dolomite, magnesite, or the like, in a vertical furnace provided with fuel feeding and combustion means and having within the treatment passage chamber of the furnace a preheating zone, a combustion zone and a cooling zone through which the material to be treated moves downwardly countercurrent to gas including combustion air moving upwardly.

In stack type furnaces for burning of granular and/or lumpy material, the hot treatment gas generally rises more freely along the wall of the furnace chamber because hollow spaces occur in the material column at the wall of the furnace and which offer only slight resistance to the flowing hot gas. In the central area of the material column, however, a fairly compact core of material pieces packed fairly closely together developes and this substantially hinders rising of the hot gases. Due to the undesirable hot gas distribution, temperatures occur at the chamber furnace wall which may be several hundred degrees above those in the material column. Therefore, performance of the furnace is considerably impaired because due to the uneven processing heat conductants, the carbonic acid contents of the treated material depositing from the center of the column is higher than that of the material deposited from the areas of the column adjacent to the wall of the furnace, and therefore nonuniform end product qualities cannot be avoided. Furthermore, the ceramic furnace lining is thermally loaded in such manner that considerable damage may occur in the lining.

A method for the calcining of carbonate containing material in a gas-heated shaft or stack furnace is known from the published German application No. 1,185,978, according to which the required entire amount of gas is introduced in the lower combustion zone by means of a central burner which is introduced into the furnace from below. However, satisfactory temperature distribution and decrease of the residual carbonic acid content in the finished material cannot be achieved. In addition, the central burner is expensively constructed and is exposed directly to the high temperatures of the firing zone which greatly reduces the burner life.

In another disclosure, according to German Patent No. 1,096,278, a method is proposed for attaining evenly calcined lime from limestone in a stack-type furnace wherein heat is generated partly with liquid fuel and partly with lumpy coke. The coke is according to that disclosure preclassified and mixed with the liquid fuel in such a way and fed to the furnace from above so that the coke fines should burn above the combustion zone and the larger lumps of coke purportedly burn below the combustion zone with the liquid fuel. According to that arrangement, however, adherence of the hot rising gases to the furnace wall does not prevent, even where the fuel coke mixture is very carefully controlled, danger of overburning of the material in areas of the wall. Because of the silo condition of the material column in the furnace, there cannot be prevented insufficient burning of the material particles of the column core, so that the material discharged from the furnace is of non-uniform quality.

It is, accordingly, an important object of the present invention to provided a method of and means for thermal treatment of granular and/or lumpy material in a vertical furnace which will avoid the drawbacks of prior arrangements and according to which in particular with respect to calcining of limestone, dolomite, magnesite or the like uniform calcined quality of the finished material removed from the furnace can be assured.

Another object of the invention is to improve the heating balance of a stack-type furnace by reducing heat losses, decreasing the flow resistance to hot gases rising in the furnace, and to achieve substantially improved real performance of the furnace.

According to features of the invention a part of the required fuel is introduced into the central area of the material column preferably in the boundary area between the preheating zone and the combustion zone, while a balance of the fuel is directed to the peripheral areas of the material column in the combustion zone. As a result of these novel steps, the material column in the furnace is enriched with the very amount of fuel necessary and sufficient to supply the densely packed core or central material in the column with adequate process heat for thorough calcining. In the attainment of this result, the material in the core area of the material column as well as adjacent to the furnace wall is deacidized uniformly. Considered in cross section within the furnace, the specific weight of the material is substantially uniform in each process stage so that as the material descends in the furnace the silo condition of the bulk material is avoided and the core area of the material column is provided with a wedge enriched with fuel which extends from a fuel charging point below the preheating zone and through the combustion zone. By virtue of the exactly defined wedge formation the material receives throughout a long combustion zone length the amount of heat required for calcining as well as for thorough deacidizing so that uniform soft burning is achieved. In addition, the invention provides for the avoidance of depositing on the furnace wall of liquid or powdered fuel residue or condensate and thus delayed heating of the furnace.

According to one embodiment of the invention, about 20% to 40%, and preferably about 30% of the required fuel is introduced into the central region of the material column. Thereby ready adaptability to various qualities required in the material in operation of the furnace is advantageously attainable, the material being treated can receive in the respective process stages the necessary volume of fuel and it is even possible to maintain process conditions for soft burning within acceptable economic limits even with low grade raw material. It is thus apparent that the present invention attains improved results even where there is a wide fluctuation in raw material composition.

According to a further embodiment of the invention the fuel is supplied to the combustion zone by means of intermittently operating fuel feeding units and/or intermittently operating combustion means at the peripheral area of the material column. This is especially advantageous in that a pulsating expansion and combustion of the preferably gasified liquid fuel takes place across the entire combustion zone of the furnace, whereby the expanding and burning fuel expands within the material column in such a way that the combustion air which has collected in the wedge-shaped core area of the material column and is not yet consumed can be displaced toward the wall areas of the furnace. As a result optimum combustion of fuel is achieved in the areas adjacent the furnace wall as well as in the core area of the material column, and the frequently observed formation of soot in the practice of heretofore known combustion methods in vertical furnaces can be almost entirely avoided.

According to the invention the combustion promoting means of the fuel feeding units at the combustion zone are advantageously controlled in such manner that the combustion air remaining unconsumed in the center of the furnace flows in the furnace zig-zag-fashion in upward direction so that the advantage of the uniform combustion of the fuel and the uniform temperature distribution is even further improved and thus desired combustion quality in a raw material charge can be maintained. Due to the uniform temperature distribution in the furnace, the walls of the furnace are substantially protected and the heretofore observable erosion of the fire-resistent lining material due to temperature fluctuations is avoided.

There is provided in a preferred embodiment of the invention an arrangement wherein the fuel feeding means and/or the combustion arrangements receive heated combustion air derived from that which is introduced at the lower end of the furnace into the cooling zone and which is shunted from the cooling zone and bypasses the material column which is located directly above the cooling zone, such air being about 30% of the volume of air introduced into the cooling zone. This is advantageous in that the cooling zone receives the benefit of the entire indraft of combustion air for quick and efficient cooling of the completely calcined material for convenient handling on discharge from the furnace. In addition, by shunting off part of the air introduced to the furnace from below, process heat from the treated material located directly above the cooling zone is removed substantially slower so that in addition to the fuel which is still burning in the core area of the column and still releases thermal energy, enough process heat exists so that the material being treated is more efficiently deacidized in the core areas of the individual material grains or material lumps. An additional advantage achieved by shunting off of the cooling air from the cooling zone is that flow resistance of the gas in the material column is lowered considerably in the area above the cooling zone, so that blower units of lesser performance and smaller sizes can be used.

A further substantial advantage of the present invention resides in the improved thermal utilization of the energy introduced into the furnace, since only the volume of air required for combustion of the necessary fuel needs to pass through the furnace and thereby less thermal loss occurs in the discharge gases.

There is further provided according to the present invention at least one fuel feeding arrangement in the furnace between the preheating zone and the combustion zone discharging into the furnace axis whereby part of the fuel requirement is introduced into the furnace through a simple and inexpensive device directly into the central area of the material column, thereby powdered, lumpy as well as liquid fuel can be used, introduced preferably by gravity feed through the discharge end of fuel feeding means directed downwardly. Such fuel supply means is preferably constructed to extend across the furnace chamber, which is an advantageous construction because it thereby attains desirable static stability by anchoring of the opposite ends of the device in the furnace wall. Further, this fuel supplying device may comprise at least one fire-resistent preferably ceramic carrier member comprising a devider which extends from the preheating zone into the combustion zone. The fuel supply may therefore be relatively low flashpoint fuel which is sufficiently protected by the thermal insulating qualities of the ceramic material of the device so that additional cooling of the fuel supply for the device is unnecessary. Since the device extends upwardly from the combustion zone into the preheating zone it affords desirable static stability for the upper end of the furnace.

According to the preferred embodiment of the invention the underside of the fuel supply carrier member is of arch-like form and the fuel supply means discharges at about the center of the arch into the furnace. This has the advantage that the fuel is thus directed into a central area of the material column in which there is a substantial concentration of unused ascending air, thereby providing a substantial oxidation zone into which the powdered, lumpy or liquid fuel is directed at the top of the combustion zone within the furnace and the material receives the units of heat which are required for rapid and complete calcining. By having the fuel suppply arrangement such that it extends downwardly from the furnace wall, the fuel supply is preheated within the arched ceramic carrier member before entering the furnace and mixing with the hot air therein for exothermic reaction.

Figure 2:
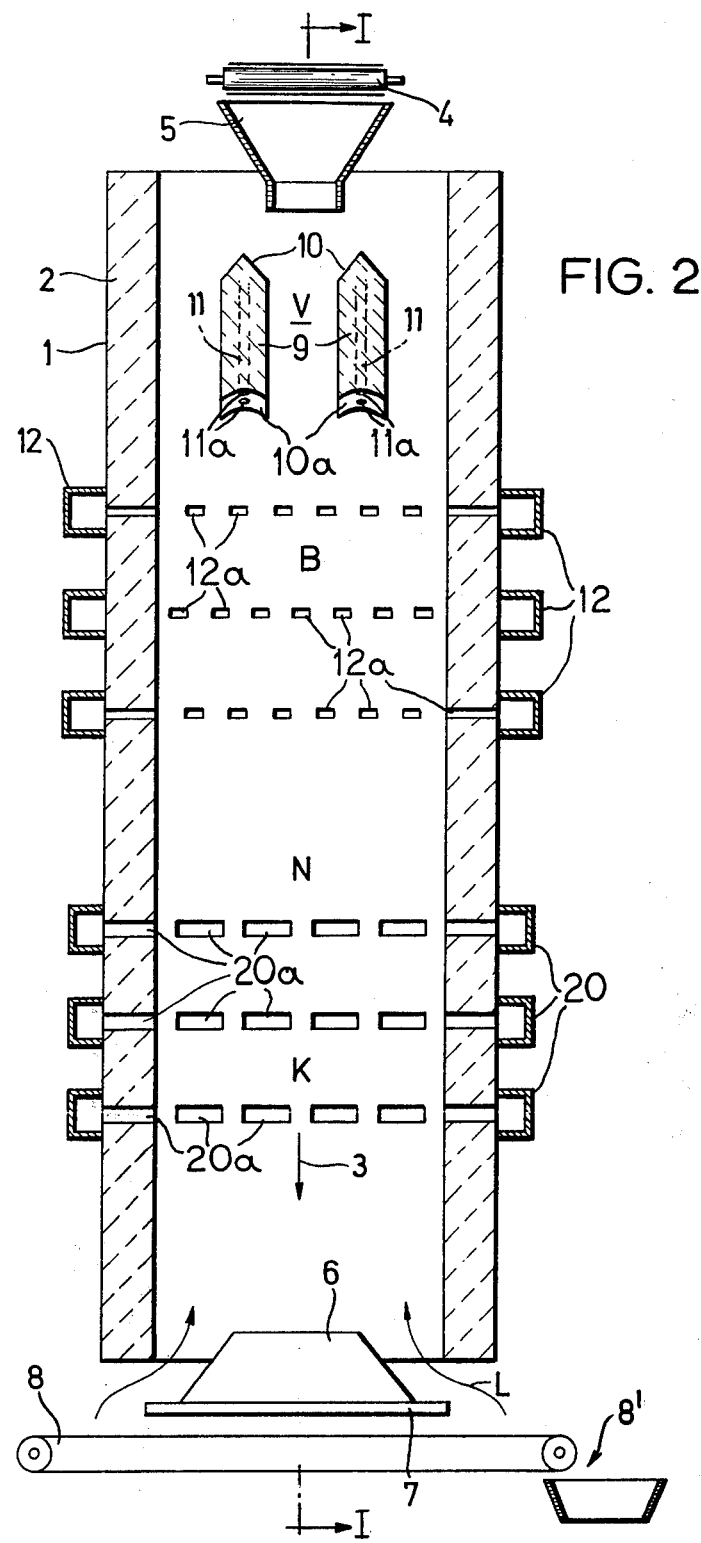

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 1 is a vertical sectional schematic view, partially in elevation, of a shaft-type calcining furnace embodying features of the invention and taken substantially along the line II of FIG. 2; and FIG. 2 is a vertical sectional view taken substantially along the line II—II of FIG. 1.

By way of example, a rectangular shaft-type calcining furnace 1 is depicted in the drawings provided with a flame resistant lining 2 defining a vertical passage treatment shaft chamber, identified at 3 by an arrow which depicts the descending progress of material to be calcined as it travels through a preheating zone V, a burning or combustion zone B and a cooling zone K. Material to be treated in the furnace 1 is delivered by means such as a conveyor 4 into a funnel shaped hopper 5 which discharges into the top of the furnace chamber. Under the lower, discharge end of the furnace 1 means are provided for receiving and removing the calcined product, and comprising a spreader of generally cone or pyramid shape on a spreader plate 7 and by which the calcined material is directed onto a conveyor 8. Air for promoting combustion, identified by the arrows L, is forcedrafted into the furnace chamber countercurrent to the descending material and ascends up through the material and the several zones to exhaust at the top of the furnace chamber, there being provided suction draft-inducing means, of conventional form, not shown, for this purpose in association with the top of the furnace shaft.

Means for implementing the important feature of prefiring the material to be calcined in the upper portion of the furnace 1, immediately below the preheating zone V and immediately above the combustion zone B, comprise at least one fuel supplying device discharging at about the center of the combustion chamber 3. In a preferred embodiment, such device comprises at least one and preferably two (depending upon the size of the furnace) fire-resistant ceramic bridge members 9 mounted in and extending across the upper portion of the furnace chamber. Each of the members 9 is of substantial height and as thin a section as practicable and extending upwardly within the preheating zone V from the upper boundary end of the combustion zone B, with their planes parallel, and located substantially equidistantly from one another at their adjacent faces and at their opposite faces being spaced about the same distance from the respective adjacent wall areas of the furnace lining 2. To facilitate passage of raw material thereby, charged from the hopper 5 adjacently thereabove, each of the members 9 has its upper edge of generally roof peak or knife edge form 10. For optimum fuel injection nozzle or port disposition, each of the members 9 has its lower edge 10a of arched form, preferably both longitudinally and transversely, substantially as shown in FIGS. 1 and 2. A plurality of fuel supply passages 11 of preferably straight tubular form extend from the outer sides of the furnace lining 2 generally diagonally downwardly into and through the respective members 9 and discharge through ports 11a at the longitudinal medium center line of the arched surfaces 10a respectively. As shown in FIG. 1, a desirable arrangement comprises having two of the fuel passages porting adjacent to the longitudinal center of the arched surfaces 10a and two additional of the passages 11 porting through the surfaces 10a of each of the members 9 intermediate the center ports and the outer ends of the arch edges 10a. At their outer ends the passages 11 are in communication with suitable fuel supply means 11b which may be manifolds and connected to suitable source of supply (not shown).

For supplying the combustion zone B with fuel, means comprising a plurality, herein three, fuel supply manifolds 12 are mounted on the outer perimeter of the furnace, and more particularly the lining 2 in vertically spaced relation and communicate with the interior of the furnace chamber 3 through respective annular series of circumferentially spaced ports 12a which are desirably relatively staggered with respect to the adjacent ports. Fuel is delivered to the manifolds 12 from any suitable source, preferably in liquid form. Preheated air is mixed with the fuel in the manifolds 12 through air supply branches 13 each controlled by suitable respective flow control or damper means 14 and receiving the air from a bypass air duct 15 communicating with the cooling zone K. For this purpose an impeller blower 16 directs air into the passage 15 from a dust collector 17 which is connected by means of an exhaust manifold 17a and branch ducts 18 controlled by means of rotably mounted damper plates 19 and communicating with respective receiving manifolds 20 encircling the cooling zone K about the outside of the liner 2 of the furnace in vertically spaced relation and communicating with the furnace chamber 3 through exhaust ports 20a.

In operation, the furnace 1 is fed with granular and-/or lumpy limestone, dolomite or magnesite to be calcined, from above by means of the conveyor 14 and the charging funnel hopper 5 delivering into the preheating zone V and then moves downwardly within the furnace chamber 3 through the preheating zone V, the combustion zone B and then through the cooling zone K and is discharged as completely calcined material below the cooling zone past the spreader 6 and plate 7 and then transported by the conveyor 8 which delivers the calcined material to further handling or processing means 8' (FIG. 2).

Part of the fuel required for burning of the material to be treated, preferably in powdered, lumpy or liquid fuel form and which may be fuel of low quality such as, for example, waste or used oil, is introduced into the upper area of the furnace chamber, desirably at the border or boundary area between the preheating zone V and the combustion zone B, by means of the fuel supply means 11 which are arranged in the members 9 which deliver the fuel into the central area of the material column. Thereby a fuel-combustion material mixture is provided which forms a wedge in the core area of the furnace due to the silo condition of the column of the material to be treated in the furnace, and extending from the charging point of the fuel through the combustion zone B. The remaining fuel required for calcining combustion is directed into the combustion zone region at three levels to the peripheral areas of the material column by the preferably intermittently operating wall carried combustion means represented by the manifolds 12. In a preferred arrangement, preferably about 30% of the required fuel is directed to the central area of the material column and the remaining 70% of the required fuel is directed to the combustion zone B through the manifolds 12, preferably in the form of a liquid fuel. The particular ratio of core supplied fuel and peripherally supplied fuel is adjustable for accommodating particular process gradations or temperature gradations in the combustion zone V and for this individual adjustment of the fuel delivered from the repsective manifolds 12 may be effected in the preferred order at the three fuel delivery levels.

The combustion promoting air L introduced into the furnace from its lower end into the cooling zone K where the treated material is still hot, ascends under efficiently cooling forced draft and transfers heat from the calcined material, as it rises in the cooling zone K. In the upper area of the cooling zone K and preferably at or adjacent to a supplementary treatment zone N located between the combustion zone V and the cooling zone K, about 30% of the air introduced into the cooling zone K is shunted off to the bypass line passage 15 and is then directed into the combustion fuel manifolds 12. The remainder of the air L flows on up through the furnace chamber, and more particularly through the combustion zone B and the preheating zone V and is removed together with the reintroduced bypass air as exhausted gas from the furnace by means of the draft producing means such as a suction blower (not shown).

The fuel supply manifolds 12 at the several levels in the combustion zone B are desirably controlled in such a way that the vaporized fuel flaming into the bulk material column within the furnace expands in a manner such that the combustion air which is uncombined and has collected in the wedge shaped density zone enriched with powdered, lumpy or liquid fuel from the supply means 11, is displaced toward the areas of the furnace chamber wall so that an approximately zig-zag shape upward movement of the combustion air is effected in the combustion zone B. Thus, the wall areas of the furnace chamber receive sufficient volume of the combustion air for virtually soot-free combustion at uniform combustion temperatures, considered over the cross section of the furnace chamber. The temperature of the bypass air from the passage 15 can be adjusted as by means of the control devices 14 at the air feeding branches 13 by controlling intake of a supply of fresh air through respective inlets 13a, thus enabling a preferred combustion air temperature for each level of the combustion zone B to be adjusted individually.

It is therefore within the scope of the invention to direct the bypass air continuously or by interim switching by operation of the blower 16, through the bypass passage 15 to the fuel supply manifolds 12 to the combustion zone B as combustion promoting air.

It will be understood that variations and modifications may be effected without departing from the spirit and scope of the novel concepts of this invention.

I claim as my invention:

1. A method of thermal treatment of granular and/or lump material, and in particular for calcining of limestone, dolomite, and magnesite, or the like, in a vertical furnace provided with fuel supply means connected to burner means, and which in respect to a vertical furnace chamber passage provides a preheating zone in the upper portion of said passage, a combustion zone below the preheating zone and a cooling zone below the combustion zone and a column of material to be treated travels in a downward direction through the passage and air moves in an upward direction through the passage, comprising:
   introducing material to be calcined into the top of the furnace chamber passage to descend as a column substantially filling the preheating, combustion and cooling zones;
   introducing a part of the required fuel for promoting calcining combustion into the upper portion of the furnace chamber passage and at substantially the core area of the material column under the preheating zone; and
   directing the remaining fuel requirements into the combustion zone area of the furnace chamber passage toward the periphery of the column of material.

2. A method according to claim 1, comprising introducing said part of the required fuel into the core at the boundary area between the preheating zone and the combustion zone.

3. A method according to claim 1, comprising introducing approximately 20 to 40%, and optimumly about 30% of the required fuel into the core area of the material column.

4. A method according to claim 1, comprising directing said remainder of the required fuel peripherally into the combustion zone of the furnace intermittently at the peripheral area of the material column.

5. A method according to claim 1, including introducing combustion air under draft into the material column from the lower end of the furnace chamber, withdrawing a part of the air thus supplied at the cooling zone and bypassing such air to the combustion zone as preheated combustion air, and permitting the remainder of the combustion air to move on through a supplementary treating zone above the cooling zone and below the combustion zone.

6. A method according to claim 1, wherein the furnace has fuel supplying means extending across the upper portion of the furnace chamber, and effecting introduction of said part of the required fuel through a plurality of ports from said fuel supplying means.

7. A method according to claim 6, comprising preheating said part of the fuel before the fuel passes from said ports into the material column.

8. A method according to claim 1, wherein the upper portion of the furnace chamber has ceramic bridge means, and conducting said part of the fuel through passages in said ceramic bridge means and thereby preheating the fuel.

9. A method according to claim 1, including bypassing from the cooling zone to said remaining fuel requirements a part of the air which is preheated in the cooling none, and modulating the temperature of the bypass air with fresh air.

10. A shaft furnace for the thermal treatment of granular and/or lumpy material and in particular for calcining of limestone, dolomite, magnesite, or the like, including a material treating passage chamber having therein an upper preheating zone, a combustion zone therebelow and a cooling zone below the combustion zone, and wherein the material to be treated travels as a substantially chamber-filling column downwardly and air and combustion gas move in upward direction through the material column, comprising:
   means for introducing material to be calcined into the top of the furnace chamber;
   means in the upper portion of the chamber under the preheating zone for introducing part of required calcining fuel into substantially the core area of the material column; and
   means for introducing the balance of the fuel requirement into the combustion zone of the chamber and toward the periphery of the material column in the combustion zone.

11. A furnace according to claim 10, wherein said means for introducing said part of the required fuel are located in the chamber at the boundary area between the preheating zone and the combustion zone.

12. A furnace according to claim 10, wherein the means for introducing said part of the fuel comprises a structure extending across the furnace chamber.

13. A furnace according to claim 10, wherein the means for introducing said part of the fuel comprises at least one fire resistant ceramic member providing a bridge extending within the furnace chamber from the combustion zone upwardly into the preheating zone.

14. A furnace according to claim 13, wherein the bottom of the ceramic member is of substantially arched form, and said means for introducing part of the fuel directs the fuel from approximately the center of the arch into the core area of the column of material in the furnace chamber.

15. A furnace according to claim 10, wherein the means for introducing the remainder of the fuel required for calcining comprises a plurality of intermittently operating fuel supply units and intermittently operating combustion means disposed about the periphery of the furnace chamber in the area of the combustion zone.

16. A furnace according to claim 10, including bypass means communicating with the cooling zone within the furnace chamber and bypassing preheated air from the cooling zone to said means for introducing the balance of the fuel to the combustion zone.

17. A furnace according to claim 16, including means communicating with said bypass means for supplying temperature modulating fresh air into the bypass air before it is delivered to said means for introducing the balance of the fuel.

18. A furnace according to claim 10, wherein said means for introducing part of the fuel includes fuel preheating means in said chamber and extending into the preheating zone.

19. A furnace according to claim 10, wherein the means for introducing the remainder of the fuel required for calcining comprises intermittently operating combustion means disposed about the periphery of the furnace chamber in the area of the combustion zone.

* * * * *